(12) United States Patent
Suzuki

(10) Patent No.: US 6,499,553 B2
(45) Date of Patent: Dec. 31, 2002

(54) CHAIN GUIDE FOR ATV

(75) Inventor: Takehito Suzuki, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 09/843,444

(22) Filed: Apr. 26, 2001

(65) Prior Publication Data

US 2002/0007978 A1 Jan. 24, 2002

(30) Foreign Application Priority Data

Apr. 27, 2000 (JP) ...................................... 2000-128533

(51) Int. Cl.⁷ ................................................ B62J 13/00
(52) U.S. Cl. ........................ 180/251; 180/231; 474/144
(58) Field of Search ................................ 474/144, 145, 474/146, 111; 280/304.3, 261, 259, 260; 180/251, 219, 231

(56) References Cited

U.S. PATENT DOCUMENTS

| | | | |
|---|---|---|---|
| 531,254 A | * 12/1894 | Biddles | |
| 1,400,131 A | * 12/1921 | Adams | |
| 3,819,002 A | * 6/1974 | Heathwaite et al. | 180/32 |
| 3,834,246 A | * 9/1974 | McGlip | 72/242.11 B |
| 4,299,582 A | * 11/1981 | Leitner | 474/109 |
| 4,705,494 A | 11/1987 | Gibson | |
| 4,733,741 A | * 3/1988 | Swanson | 180/219 |
| 4,754,833 A | * 7/1988 | Kawashima | 180/219 |
| 4,800,979 A | * 1/1989 | Tatsuji | 180/227 |
| 5,318,482 A | * 6/1994 | Sato et al. | 474/111 |
| 5,445,568 A | * 8/1995 | Fukuzawa et al. | 474/144 |

* cited by examiner

Primary Examiner—Avraham Lerner
(74) Attorney, Agent, or Firm—Knobbe, Martens, Olson & Bear, LLP

(57) ABSTRACT

An all terrain vehicle comprises an engine that powers a chain or belt operated final drive. The final drive comprises an drive sprocket and a driven sprocket. The driven sprocket is capable of pivotal movement relative to the engine. In one arrangement, the driven sprocket is mounted to a rear portion of a swing arm. The swing arm is pivotally mounted to a frame assembly of the vehicle. A guide member is mounted to the swing arm and is pivotally mounted to the frame assembly. The guide member is laterally displaced from bearings used to journal the swing arm for pivotal movement.

22 Claims, 6 Drawing Sheets

CHAIN GUIDE FOR ATV

RELATED APPLICATIONS

This application is related to and claims the priority of Japanese Patent Application No. 2000-128533, which was filed on Apr. 27, 2000.

BACKGROUND OF THE INVENTION

1. Field of the Invention

The present invention generally relates to chain drives for land vehicles having at least one chain driven wheel. More particularly, the present invention relates to chain guides used in such drives.

2. Description of the Related Art

Recreational all terrain vehicles generally comprise a frame that is carried by at least one front wheel and a pair of rear wheels. The rear wheels typically are attached to the frame with a swing arm, which is connected to a rear portion of the frame and which is capable of pivotal movement relative to the frame about a generally horizontal axis. A shock absorber often is disposed between the swing arm and the frame to control movement of the swing arm during operation of the vehicle over rough terrain.

In some configurations, the rear wheels are driven by a final drive that includes a chain drive. The chain drive in such configurations comprises a drive pulley powered by an output shaft from an engine associated with the vehicle. A driven pulley is connected to the rear wheels and is driven by an endless roller chain that loops around the drive pulley and the driven pulley. Because a swing arm, which pivots up and down relative to a lower portion of the frame assembly, connects the rear wheels to the frame assembly, a chain guide can be provided to reduce slapping of the chain against the frame assembly or the swing arm.

Generally, at the pivot location, the swing arm connection comprises a tubular member that is journaled on a shaft with roller bearings. The bearings provide relatively free movement between the tubular member, which is associated with the swing arm, and the shaft, which is typically fixed to the frame assembly. Because of the size of the bearings, the tubular member generally has a large outside diameter due to the enlarged inside diameter required to accommodate the bearings.

To reduce the width of the associated vehicle, attempts have been made to reduce the length of the sleeve and shaft associated with the swing arm coupling. In addition, the drive pulley and the driven pulley have been moved laterally inward. In moving these components, the chain now passes over a portion of the swing arm coupling proximate the bearings. Because of this relative positioning, the chain guide needs to be positioned over this portion of the swing arm coupling as well. Unfortunately, due to the enlarged diameter of the tubular member, the chain guide is positioned higher than desirable. For instance, the elevated location of a guiding surface of the chain guide creates a rather abrupt angle in the chain at a forward end of the chain guide as the chain is loading onto the drive pulley. This disadvantageous angle can increase wear on the chain guide as the chain rubs over the end of the supporting surface. Such wear can rapidly decrease the life expectancy of the chain guide.

SUMMARY OF THE INVENTION

One proposed solution to this problem is to elevate the location of the drive pulley relative to the driven pulley. By elevating the drive pulley, the angle created during loading of the chain onto the drive pulley can be returned closer to 180 degrees such that no perceivable angle necessarily results. Elevating the drive pulley, however, results in an elevated center of gravity for the vehicle. Elevating the center of gravity of an all terrain vehicle is not desired. In fact, to the extent possible, one design goal of an all terrain vehicle is to lower the center of gravity. Accordingly, this proposed solution, while feasible, is less than desirable.

Another proposed solution is to lower the height of the pivot location and thereby lower the position of the chain guide. By lowering the pivot location, the angle of the chain during loading onto the drive pulley is decreased. Thus, wear on the chain guide end can be reduced; however, another design parameter for all terrain vehicles seeks to increase the clearance between the bottom of the vehicle and the ground. Lowering the pivot location of the rear swing arm, which forms a portion of the rear suspension system, thus disadvantageously reduces the clearance between the vehicle and the ground. Therefore, this solution, while again being workable, is less than desirable.

Accordingly, a chain guide and pivot location configuration is desired whereby the chain loading angle can be close to 180 degrees while also accommodating the components of the pivot and the chain guide.

Thus, one aspect of the present invention involves an all terrain vehicle comprising a frame assembly. At least one dirigible front wheel is attached to the frame assembly. A swing arm is pivotally mounted to the frame assembly. At least one rear wheel is connected to the swing arm. The swing arm comprises an outer lateral surface and a forward sleeve. The forward sleeve is journaled about a pivot shaft while the pivot shaft is connected to the frame assembly. At least one bearing member is disposed generally between the forward sleeve and the pivot shaft. An engine is mounted to the frame assembly with the engine comprising an output shaft. A drive pulley is powered by the output shaft and a driven pulley is connected to the at least one rear wheel. A flexible transmitter extends between the drive pulley and the driven pulley. A guide member is pivotally connected to the frame assembly proximate the forward sleeve of the swing arm. The guide member extends forward beyond at least a portion of the forward sleeve at a location generally laterally displaced from the at least one bearing member.

Another aspect of the present invention involves a guide member for an all terrain vehicle. The vehicle comprises a frame assembly and a swing arm pivotally connected to the frame assembly at a pivot joint. The swing arm comprises an outside lateral surface. The guide member comprises an upper guide surface with a retaining lip extending along at least a portion of the guide surface. The retaining lip extends upward from the guide surface. The guide member is adapted to be pivotally connected to the frame assembly and the guide member is adapted to be fixed to the outside lateral surface of the swing arm.

A further aspect of the present invention involves a guide member for use on an all terrain vehicle. The vehicle comprises a frame assembly. At least one dirigible front wheel is attached to the frame assembly and a swing arm is pivotally mounted to the frame assembly. At least one rear wheel is connected to the swing arm and the swing arm comprises an outer lateral surface and a forward sleeve. The forward sleeve is journaled about a pivot shaft and the pivot shaft is connected to the frame assembly. At least one bearing member is disposed generally between the forward sleeve and the pivot shaft. An engine is mounted to the frame assembly. The engine comprises an output shaft and a drive pulley is powered by the output shaft. A driven pulley is connected to the at least one rear wheel while a flexible transmitter extends between the drive pulley and the driven pulley. The guide member comprises a first portion adapted to be pivotally connected to the frame assembly proximate the forward sleeve of the swing arm such that the guide member extends forward beyond at least a portion of the forward sleeve at a location laterally displaced from the at least one bearing member.

BRIEF DESCRIPTION OF THE DRAWINGS

These and other features, aspects and advantages of the present invention will be described with reference to accompanying drawings. The drawings comprise six figures.

DETAILED DESCRIPTION OF THE PREFERRED EMBODIMENT

Figure 1:
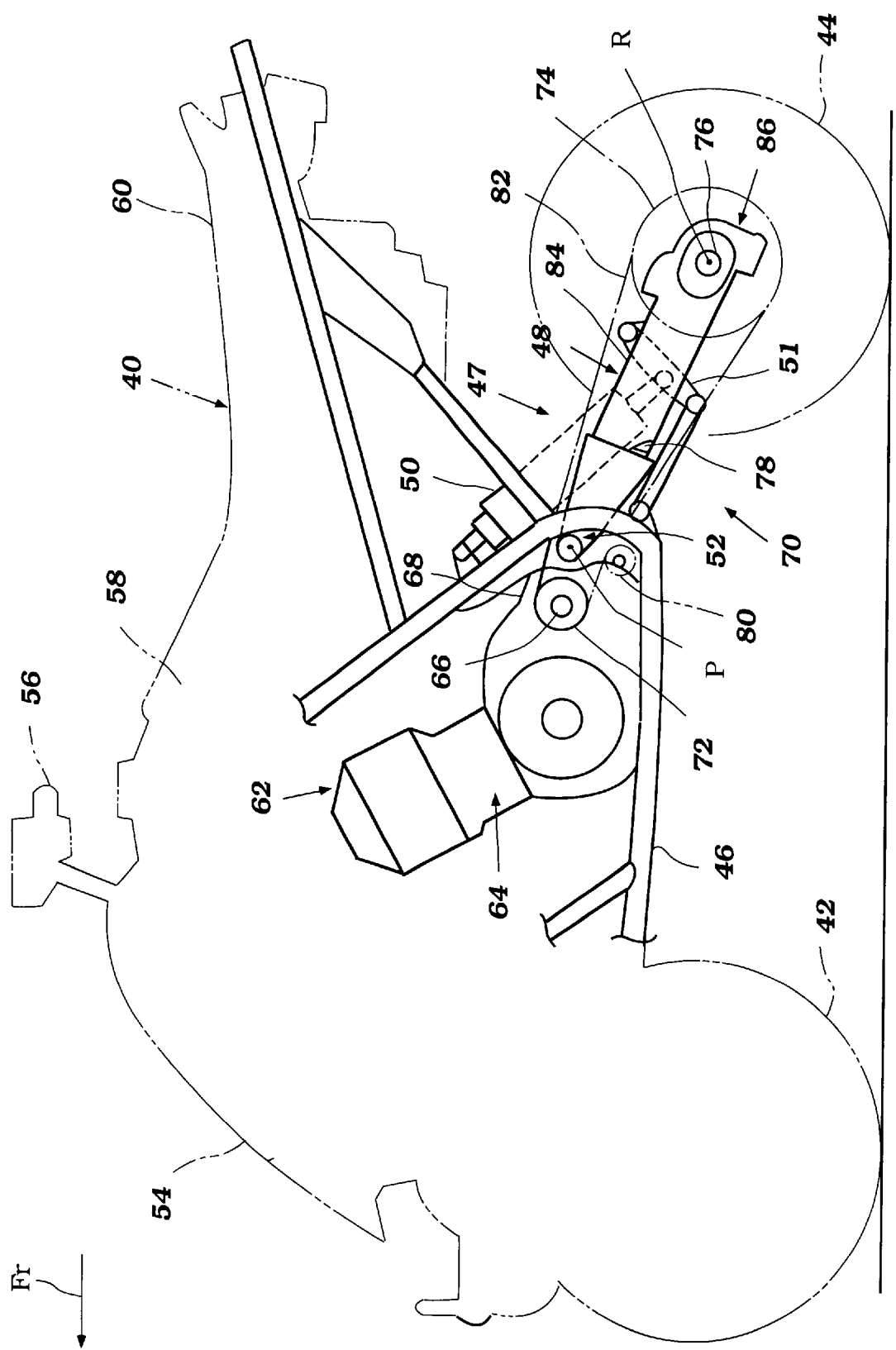
FIG. 1 is a simplified side elevation view of an all terrain vehicle having a swing arm pivot and chain guide arranged and configured in accordance with the present invention. Certain features of the vehicle are outlined in phantom and an arrow labeled "Fr" is provided to show the forward direction.
Figure 2:
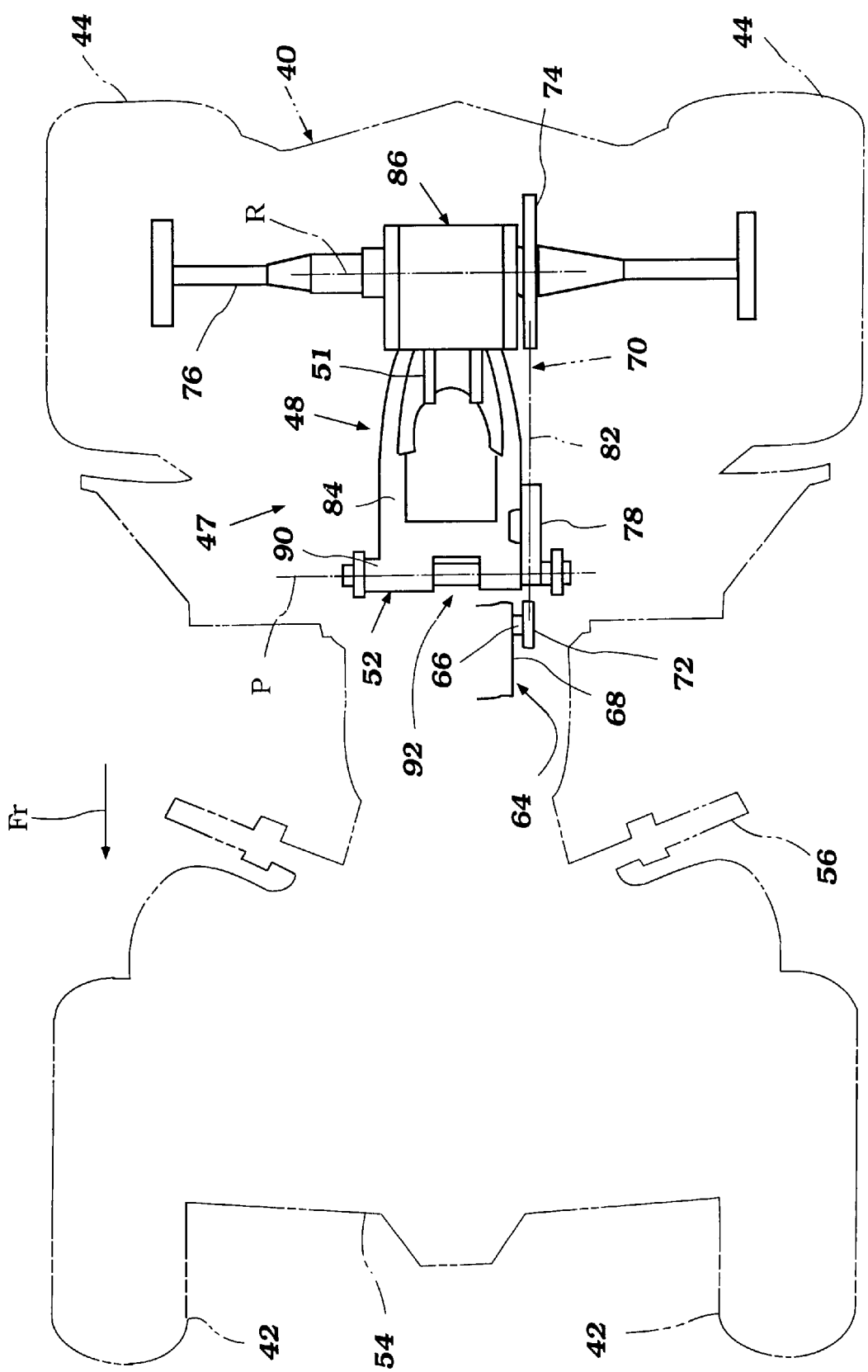
FIG. 2 is a simplified top plan view of the vehicle of FIG. 1. Certain features of the vehicle are outlined in phantom and an arrow labeled "Fr" is provided to show the forward direction.

With reference initially to FIGS. 1 and 2, an all terrain vehicle having a chain drive and swing arm including a chain guide arranged and configured in accordance with certain features, aspects and advantages of the present invention is illustrated therein. While the chain drive and swing arm will be described in the context of a four wheeled all terrain vehicle, other vehicles also can employ certain features, aspects and advantages of the present invention. For instance, potentially any vehicle having a belt driven or chain driven rear wheel can benefit from certain features of the present invention. Thus, vehicles such as motor scooters, lawn mowers, go carts and the like can benefit from some of the features of the present invention. In addition, vehicles employing swing arms or even independently suspended rear wheels can benefit from certain features of the present invention.

With continued reference to FIGS. 1 and 2, the illustrated vehicle 40 generally comprises a pair of front wheels 42 and a pair of rear wheels 44. The dirigible front wheels 42 carry a forward portion of a frame assembly 46. The rear wheels 44 are connected to the frame assembly 46 by a suspension system 47 that includes the swing arm 48 in the illustrated arrangement. In some applications, the rear wheels may be independently suspended.

With the assistance of a shock absorber 50 and an attached two bar linkage 51, the swing arm 48 supports a rear portion of the illustrated frame assembly 46. The swing arm 48 is connected to the frame assembly 46 at a pivot axis P by a pivot shaft 52. In the illustrated arrangement, the pivot axis P is forward of a rear elbow of the frame assembly (i.e., disposed within the frame assembly); however, in other arrangements, the pivot axis P may be positioned rearward of the frame assembly (i.e., disposed outside of the frame assembly). The connection between the swing arm 48 and the frame assembly 46 will be described in more detail below.

The frame assembly 46 supports a number of body components of the vehicle 40. For instance, a forward fender assembly 54 can be positioned over the dirigible front wheels 42. The fender assembly 54 preferably includes a forward cowling that wraps rearward around a portion of a steering handle arrangement 56. The steering handle arrangement 56 is operably connected to the front wheels 42 to steer the front wheels in a known manner.

Rearward of the illustrated steering handle arrangement, a fuel tank 58 and a seat 60 are supported by the frame assembly 46 in any suitable manner. The frame assembly 46 also defines an engine compartment 62 within which an engine 64 is mounted in a suitable manner. An output shaft 66 that is driven by the engine 64 is disposed generally forward of the pivot axis P in the illustrated arrangement. Preferably, the output shaft 66 is disposed within a transfer case 68 and is driven by a transmission that is also contained at least in part within the transfer case 68.

The rear wheels 44 preferably are driven by the rotational power output from the output shaft 66. In the illustrated arrangement, the output shaft 66 drives the rear wheels 44 through a chain drive 70; however, belt drives and other suitable driving configurations also can be used. As illustrated, the output shaft 66 carries a drive sprocket 72. The drive sprocket 72 powers a driven sprocket 74 that is connected to an axle 76 of the rear wheels 44. The driven sprocket 74 and the rear axle 76 preferably rotate about a rear axis of rotation R.

It should be mentioned that, in the case of independently suspended rear wheels, the driven sprocket 74 can be connected to the associated constant velocity joints in any suitable manner. Preferably, a chain guide 78 and a tensioning roller 80 also are provided. The chain guide reduces wear on the chain and maintains accurate loading of the chain onto the drive sprocket 72 while the tensioning roller 80 helps remove slack created during movement of the swing arm 48 relative to the frame assembly 46. Moreover, while implicit in the above-discussion, the chain drive 70 also includes a roller chain 82, or any other suitable, flexible and endless transmitter. The configuration of the presently preferred chain guide 78 will be described in more detail below.

As discussed above, the swing arm 48 preferably comprises a neck portion 84 and a bearing carrying portion 86. The neck portion 84 extends rearward to the bearing carrying portion 86. Thus, the neck portion 84 is pivotally attached to the frame assembly 46 and the bearing carrying portion 86 supports the axle 76 for rotation. Of course, the bearing carrying portion 86 allows adjustment of the axle location relative to the frame assembly 46 such that the distance between the pivot axis P and the rotational axis R can be adjusted to increase or decrease the tension on the stationary chain drive 70.

Figure 3:
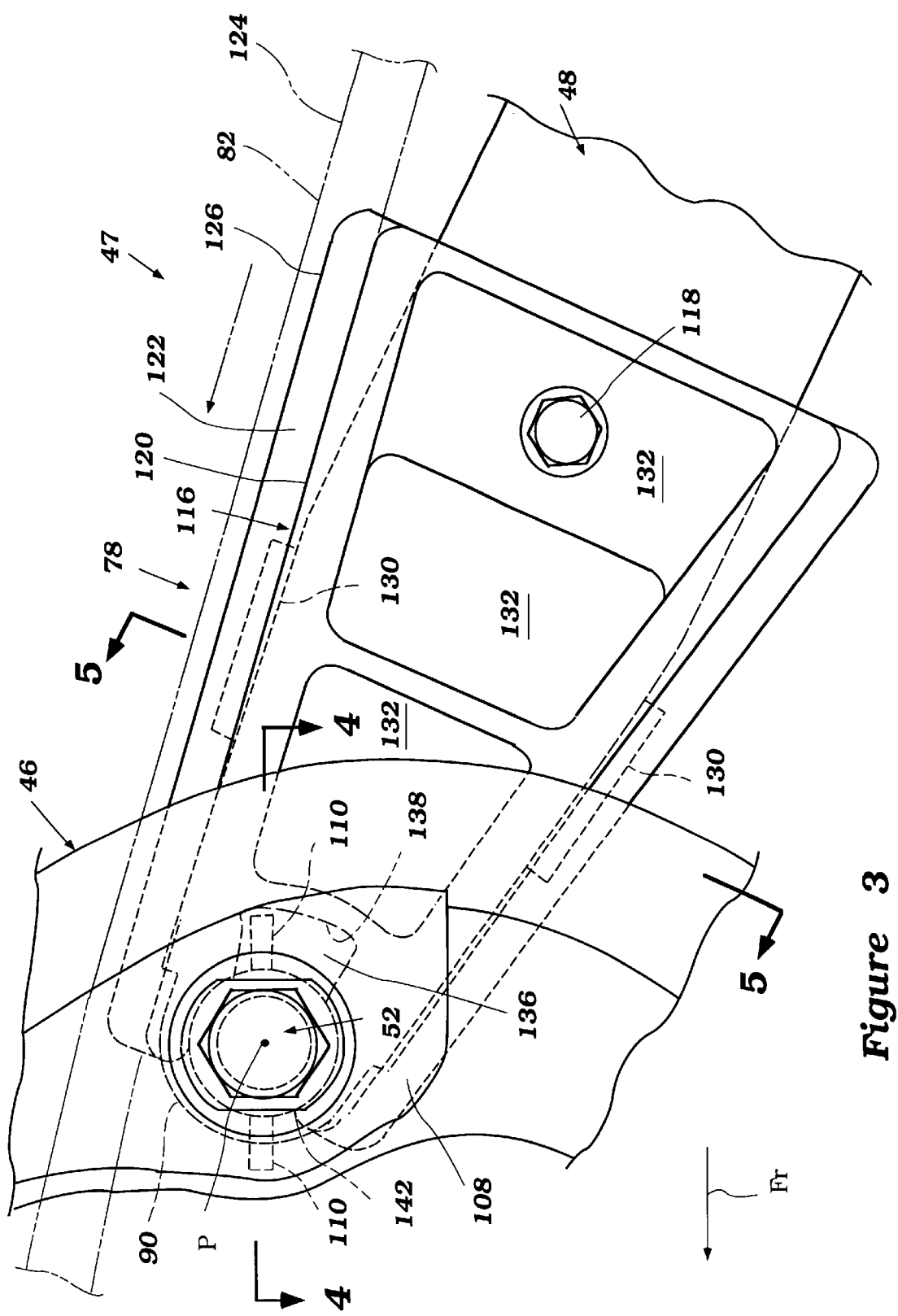
FIG. 3 is an enlarged side elevation view of the pivot and chain guide with certain hidden components shown with hidden lines and the chain shown with phantom lines.
Figure 4:
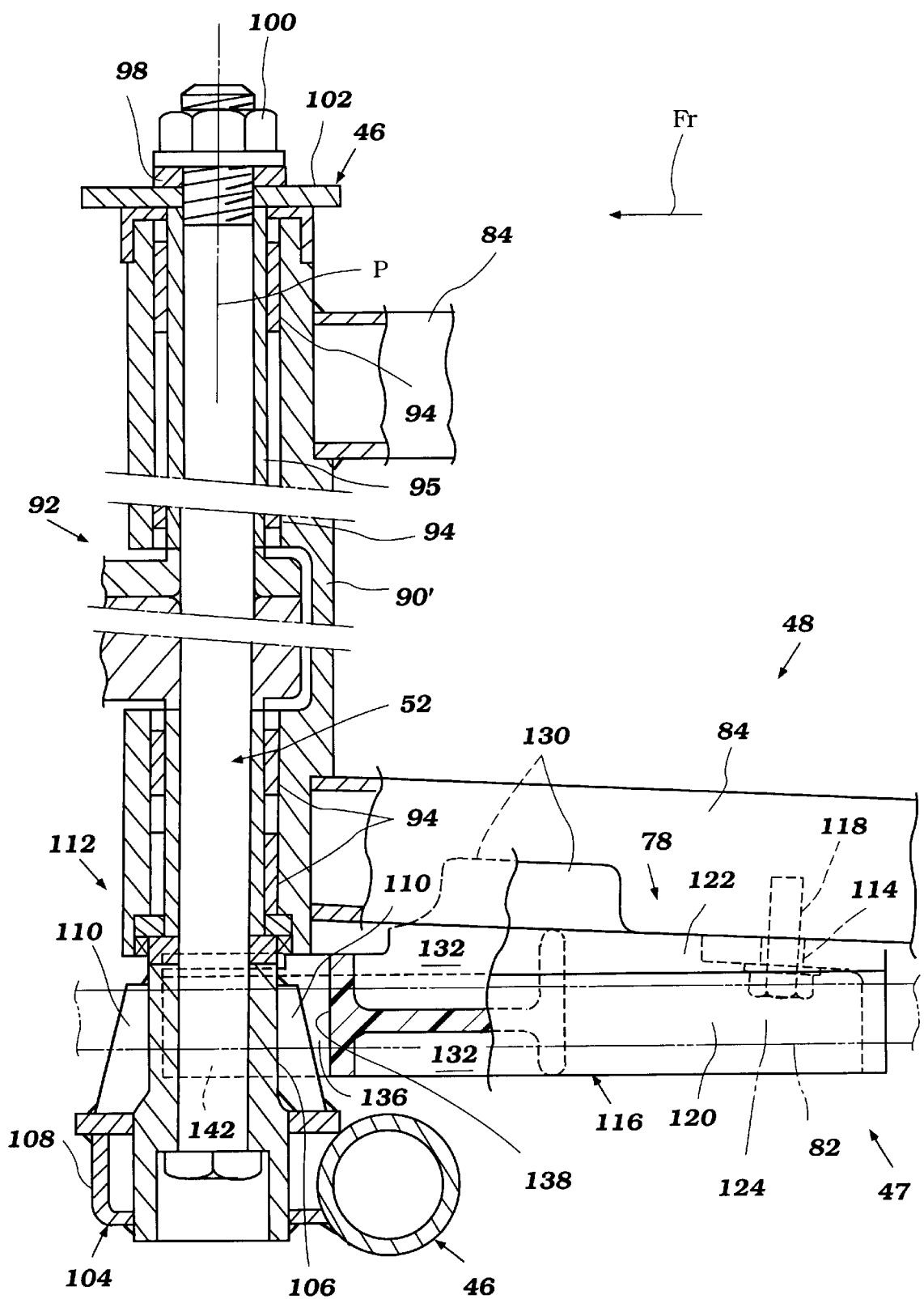
FIG. 4 is a sectioned plan view of the pivot and chain guide of FIG. 3 taken along the line 4—4 in FIG. 3.

With reference now to FIGS. 3 and 4, a presently preferred pivotal connection between the swing arm 48 and the frame assembly 46 will be described. In the illustrated arrangement, the swing arm 48 comprises a split sleeve 90 disposed at a forward end of the neck portion 84. The sleeve 90 preferably has a partially open portion 92, as shown in FIG. 2. The sleeve 90 also preferably is sized and configured to receive the pivot shaft 52, which defines the pivot axis P in the illustrated arrangement.

Interposed between the pivot shaft 52 and the sleeve 90 along portions of the length of the pivot shaft 52 are bearings 94. The bearings 94 can be any suitable bearing, such as a needle bearing. In some applications, bushings can be used to replace or in addition to the bearings 94. The bearings 94 serve to reduce friction loading between the pivot shaft 52 and the sleeve 90. By reducing the friction loading, wear is reduced and the life of the sleeve can be increased such that the life of the associated swing arm assembly also can be increased. In the illustrated arrangement, a further tubular member 95 encases the pivot shaft 52 and is positioned between the pivot shaft 52 and the bearings 94.

At one end of the pivot shaft 52, the sleeve 90 is enclosed by a cap 96. The cap 96 preferably is secured in position using a washer assembly 98 and a nut 100. The washer assembly and the nut 100 preferably are positioned on one side of a mounting flange 102, which forms a portion of the frame assembly. In the illustrated arrangement, the mounting flange 102 is a plate of material that is positioned in an elbow of the frame assembly. In some arrangements, the mounting flange 102 can extend rearward of the frame assembly such that the pivot axis P is located outside of the frame assembly.

At the other end of the pivot shaft 52, the sleeve preferably terminates short of the frame assembly 46. In the illustrated arrangement, a fixture 104 is mounted to the frame assembly 46. The fixture 104 preferably comprises a stub sleeve 106 that is secured within a box frame 108. A pair of gussets 110 extend between the illustrated box frame 108 and the front and rear surfaces of the stub sleeve 106. The gussets 110 reinforce the stub sleeve 106 and increase the load bearing ability of the stub sleeve 106.

With continued reference to FIG. 4, a bearing and sealing arrangement 112 preferably is interposed between the stub sleeve 106 and the sleeve 90. This arrangement 112 provides for relative movement between the stub sleeve 106 and the sleeve 90 while also sealing the inside of the sleeve 90 against large amounts of contaminants, such as dirt, dust and other debris encountered during operation of the vehicle.

The swing arm 48, therefore, can pivot relative to the frame assembly 46 about the pivot axis P. The chain guide 78 preferably is connected to the swing arm 48. In the illustrated arrangement, the chain guide 78 includes an aperture 114 disposed within a main body 116 of the chain guide 78. A threaded fastener 118 extends through the aperture 114 and extends into a portion of the swing arm 48, where it is received within a threaded opening. Of course, a nut or the like also can be used to secure the threaded fastener 118 in position.

Figure 5:
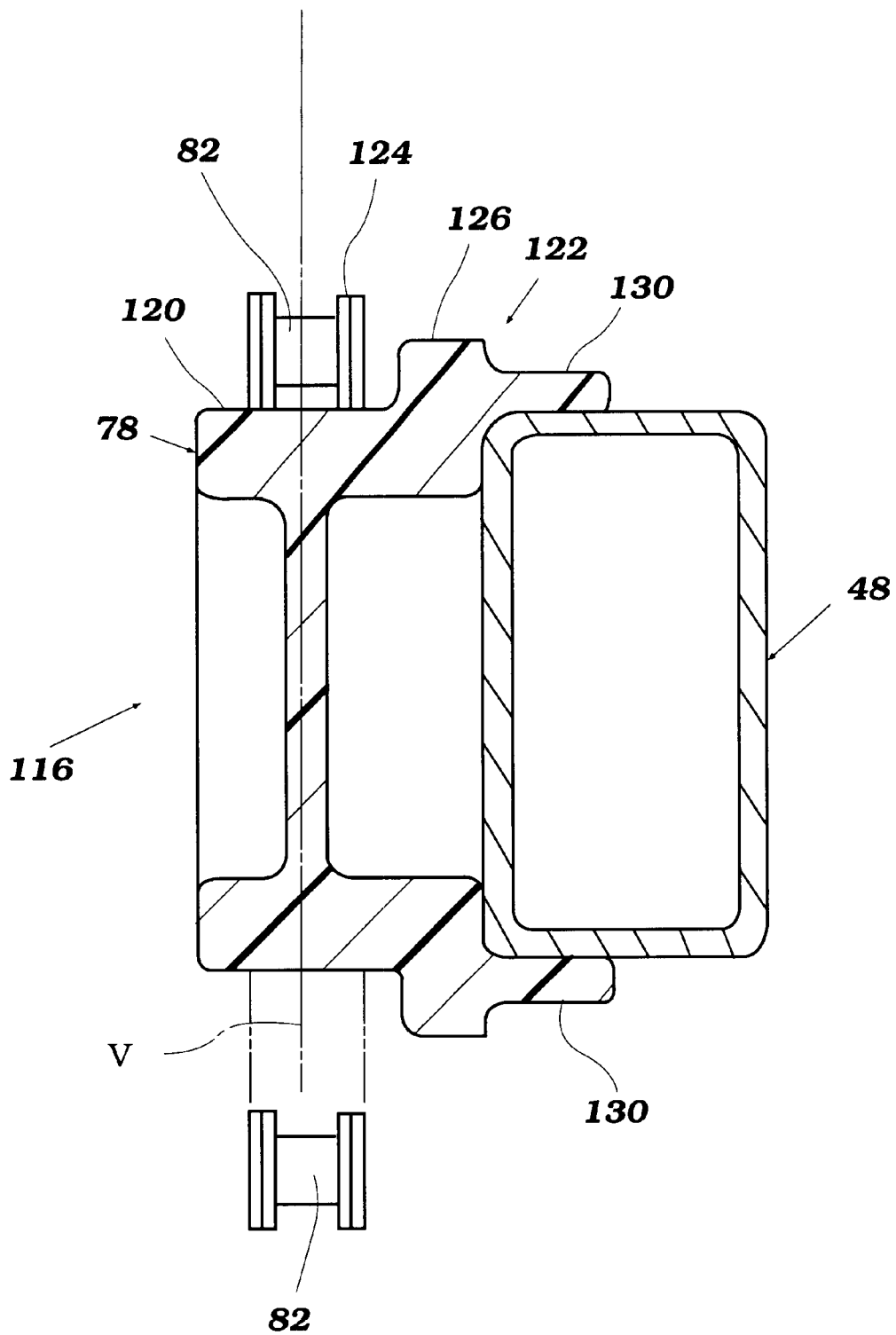
FIG. 5 is a sectioned end view of the chain guide, chain and swing arm of FIG. 3 taken along the line 5—5 in FIG. 3.
Figure 6:
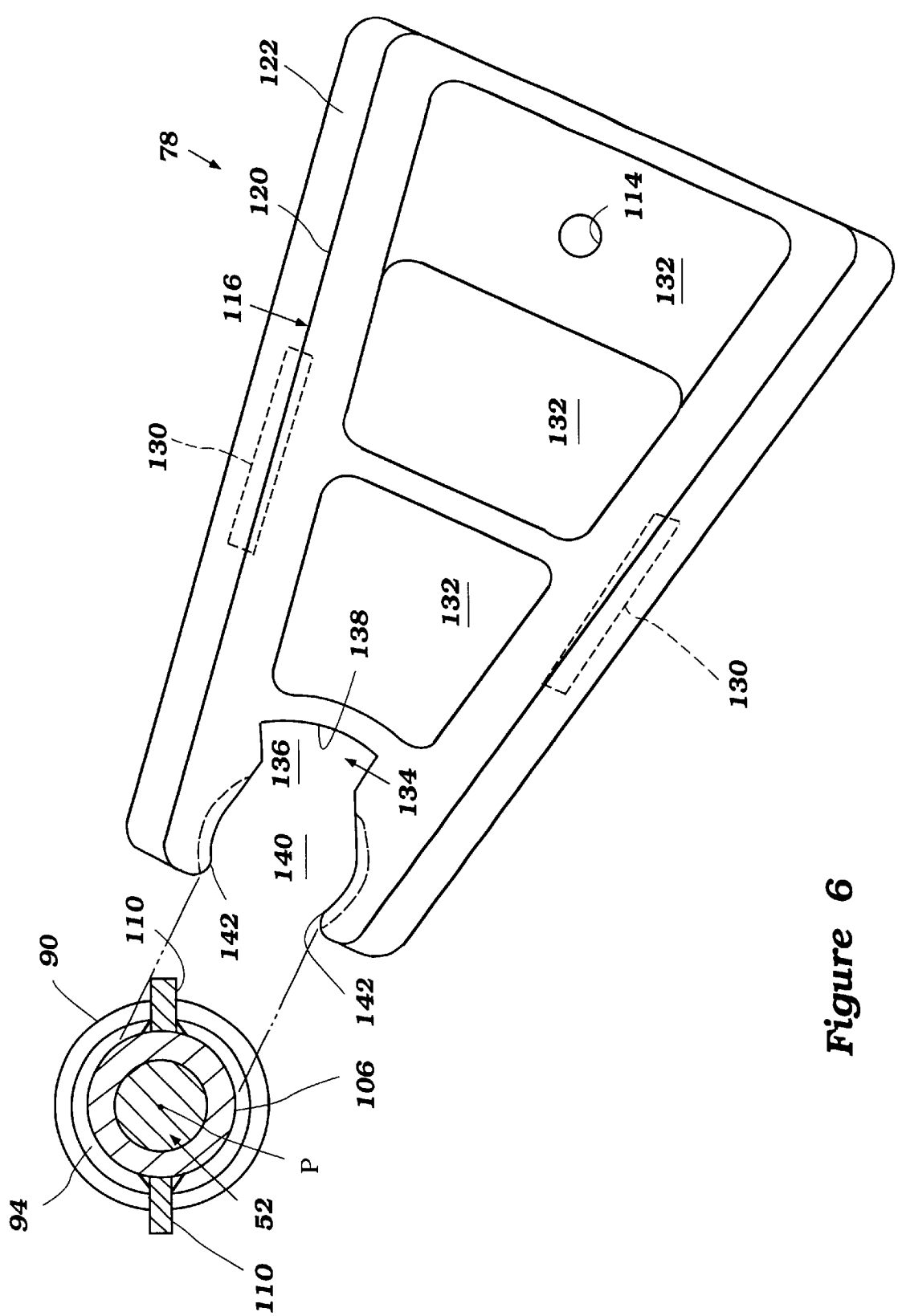
FIG. 6 is a simplified assembly view of a portion of the pivot and the chain guide of FIG. 3.

With reference now to FIGS. 5 and 6, the chain guide 78 will be described in greater detail. As illustrated, the chain guide 78 generally comprises an upper support surface 120. The support surface 120 advantageously provides a location along which the chain 82 can slide. Preferably, the support surface 120 extends along substantially the entire length of the chain guide 78. The forward end of the support surface 120 preferably is rounded to ease the transfer of the chain 82 toward the loading location of the drive sprocket. As illustrated in FIG. 3, the chain 82 may slightly change angle at the forward end of the support surface 120.

Along side at least a portion, and more preferably the entire length, of the support surface is a retaining lip 122. Preferably, the retaining lip 122 is positioned toward the center of the vehicle. In some arrangements, a pair of retaining lips may extend upward from the support surface 120 on both sides of the support surface 120. In the illustrated arrangement, an upper surface 124 of the chain 82 is vertically above an upper surface 126 of the retaining lip 122. It should be noted that while the illustrated chain guide 78 is generally symmetrical about a transverse longitudinal plane, the chain guide need not be symmetrically formed. Furthermore, in some arrangements, the cross section shown in FIG. 5 may be symmetrically formed about the center of the chain guide 78 such that upon sufficient wear, the chain guide 78 can be removed and reversed such that the bottom side becomes a fresh top side for continued use. In the illustrated arrangement, if a generally vertical reference plane V extends through the support surface 120 such that the support surface 120 is generally bisected, the chain guide 78 is not symmetric about the plane V (see FIG. 5).

With continued reference to FIG. 5, an inner portion of the main body 116 of the chain guide 78 comprises a pair of flanges 130. The flanges 130, which are disposed on top of and below the swing arm 48 when installed help during mounting and also help transfer loads and movement between the chain guide 78 and the swing arm 48. In the illustrated arrangement, the flanges are disposed about half way along the length of the chain guide 78 and are fairly short in length. Preferably, the flanges 130 are disposed along the swing arm 48 forward of a location in which the swing arm 48 begins to taper. In other arrangements, the flanges 130 can be elongated and can be positioned in other general locations. Furthermore, in some arrangements, two or more flanges 130 can be positioned along both the top and the bottom. Likewise, the number can vary between top and bottom.

The chain guide 78 also features a number of recesses and cut-out portions 132. These recesses and cut-out portions 132 help to reduce the weight of the chain guide and are preferably designed so that the strength and integrity of the chain guide 78 are not substantially affected. A forward cut-out 134 also is provided. The forward cut-out 134 comprises a rearward arcuate portion 136 that is defined by a recessed wall 138. The recessed wall 138 and the rearward portion 136 need not be arcuate in shape; however, the arcuate shape efficiently accommodates movement of the chain guide 78 relative to the gusset 110. Thus, as can be appreciated, as the swing arm 48 and the chain guide 78 pivot relative to the fixed gusset 110, the rearward edge of the gusset 110 defines an arcuate path within the chain guide 78 that advantageously corresponds to the rearward portion 136.

The forward cut-out 134 also comprises a circular opening 140 that is at least partially defined by a pair of spaced lips 142. The spaced lips 142 are defined at a forward end of the chain guide 78 and allow the chain guide 78 to be snap-fit over the stub sleeve 106. In the illustrated arrangement, the lips 142 are separated by a distance that is slightly less than the outer diameter of the corresponding portion of the stub sleeve 106. Of course, due to the fastener 118, the lips 142 need not provide a snap fit in all applications. Preferably, once is position, the chain guide 78 is capable of rather easy pivotal movement relative to the stub sleeve 106. As will be appreciated from FIG. 6, the circular opening 140 advantageously has an inner diameter that is generally smaller than an outer diameter of the sleeve 90. Thus, the size of the chain guide 78 can be reduced and the angle of the chain coming off of the front of the chain guide to be loaded onto the drive pulley is brought closer to zero degrees (i.e., 180 degrees from in to chain guide to out of chain guide).

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An all terrain vehicle comprising a frame assembly, at least one dirigible front wheel attached to said frame assembly, a swing arm being pivotally mounted to said frame assembly, at least one rear wheel connected to said swing arm, said swing arm comprising an outer lateral surface and a forward sleeve, said forward sleeve being journaled about a pivot shaft, said pivot shaft being connected to said frame assembly, at least one bearing member being disposed generally between said forward sleeve and said pivot shaft, an engine being mounted to said frame assembly, said engine comprising an output shaft, a drive pulley powered by said output shaft, a driven pulley connected to said at least one rear wheel, a flexible transmitter extending between said drive pulley and said driven pulley, a guide member pivotally connected to said frame assembly proximate said forward sleeve of said swing arm, said guide member extending forward beyond at least a portion of said forward sleeve at a location laterally displaced from said at least one bearing member.

2. The vehicle of claim 1, wherein said flexible transmitter is a chain, said chain having a lower surface, said guide having a support surface, said lower surface of said chain capable of sliding along at least a portion of said support surface.

3. The vehicle of claim 2, wherein said guide further comprises a retaining lip disposed along a lateral edge of said support surface.

4. The vehicle of claim 3, wherein said lateral edge is an edge of said support surface closest to said outer lateral surface of said swing arm.

5. The vehicle of claim 1, wherein said frame assembly comprises a stub sleeve that is generally aligned with said forward sleeve and said guide member being clamped to said stub sleeve.

6. The vehicle of claim 5, wherein said stub sleeve is fixed relative to said frame assembly and said guide member is pivotal relative to said stub sleeve.

7. The vehicle of claim 6, wherein said stub sleeve is mounted at least partially within a box frame secured to a tube of said frame assembly.

8. The vehicle of claim 7, wherein gussets extend between a portion of said stub sleeve and said box frame.

9. The vehicle of claim 8, wherein said guide member comprises an arcuate cut-out that generally corresponds to a path swept by said gusset when said guide member pivots relative to said stub sleeve.

10. The vehicle of claim 1, wherein said guide member is secured to said swing arm.

11. The vehicle of claim 10, wherein said guide member is secured to said outer lateral surface of said swing arm.

12. The vehicle of claim 1, wherein said guide member comprises a generally circular forward opening, said generally circular forward opening having an inside diameter, said bearing member having an outside diameter, said inside diameter being smaller than said outside diameter.

13. The vehicle of claim 12, wherein said guide member comprises a pair of lips at a forward end, said lips defining an entrance into said generally circular forward opening.

14. The vehicle of claim 1, wherein said swing arm comprises an upper surface and a lower surface, said guide member having a pair of flanges that at least partially overlie said upper surface and said lower surface.

15. The vehicle of claim 14, wherein said swing arm comprises a first longitudinal position being defined at a location in which said upper surface and said lower surface begin to converge and said flanges overlie a portion of said upper surface and said lower surface at a location forward of said first longitudinal position.

16. A guide member for use on an all terrain vehicle comprising a frame assembly, at least one dirigible front wheel being attached to the frame assembly, a swing arm being pivotally mounted to the frame assembly, at least one rear wheel being connected to the swing arm, the swing arm comprising an outer lateral surface and a forward sleeve, the forward sleeve being journaled about a pivot shaft, the pivot shaft being connected to the frame assembly, at least one bearing member being disposed generally between the forward sleeve and the pivot shaft, an engine being mounted to the frame assembly, the engine comprising an output shaft, a drive pulley powered by the output shaft, a driven pulley connected to the at least one rear wheel, a flexible transmitter extending between the drive pulley and the driven pulley, the guide member comprising a first portion adapted to be pivotally connected to the frame assembly proximate the forward sleeve of the swing arm such that said guide member extends forward beyond at least a portion of the forward sleeve at a location laterally displaced from the at least one bearing member.

17. The guide member of claim 16, wherein said first portion comprises a generally circular opening, said opening having an open end adapted to pass over the pivot shaft.

18. The guide member of claim 17, wherein said guide member comprises an upper support surface and a retaining wall extending along at least a portion of said support surface.

19. The guide member of claim 18, wherein said retaining wall is generally coextensive with said support surface.

20. The guide member of claim 19, wherein said guide member further comprises a main body and at least one support flange that extends from said main body in a direction generally opposite to said support surface.

21. The guide member of claim 20, wherein said at least one support flange comprises an upper support flange and a lower support flange.

22. The guide member of claim 21, in combination with the all terrain vehicle, the guide member comprising a contact surface, the contact surface abutting at least the outer lateral surface of the swing arm.

* * * * *